P. H. Kells,
Horse Power.

No. 406. Reissued Oct. 28, 1856.

AM. PHOTO-LITHO. CO. N.Y. (OSBORNE'S PROCESS.)

UNITED STATES PATENT OFFICE.

PHILIP H. KELLS, OF HUDSON, NEW YORK.

IMPROVEMENT IN REVERSIBLE HORSE-POWERS.

Specification forming part of Letters Patent No. 15,296, dated July 8, 1856; Reissue No. 406, dated October 28, 1856.

*To all whom it may concern:*

Be it known that I, PHILIP H. KELLS, of Hudson, in the county of Columbia and State of New York, have invented a new and useful Improvement in Horse-Powers; and I do hereby declare that the following is a full, clear, and exact description of the construction and operation of the same, reference being had to the annexed drawings, forming part of this specification, in which—

Figure 3:
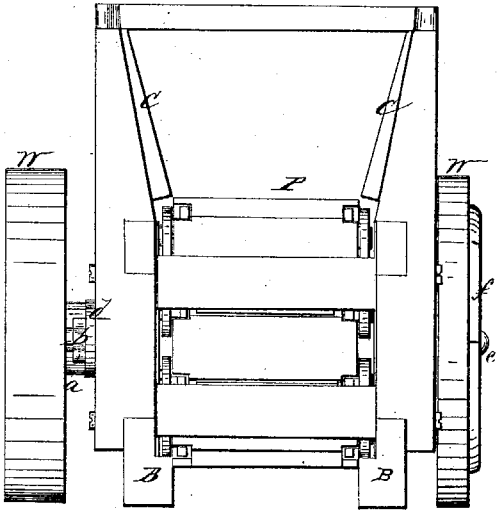
Figure 1:
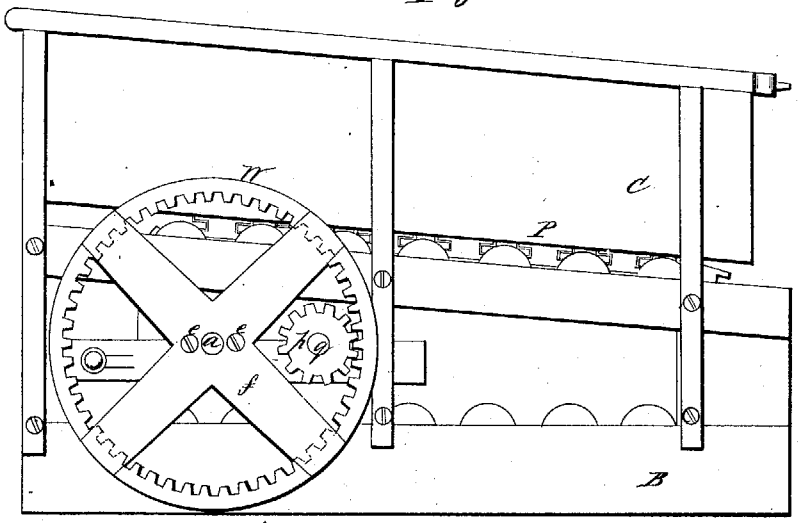
Figure 2:
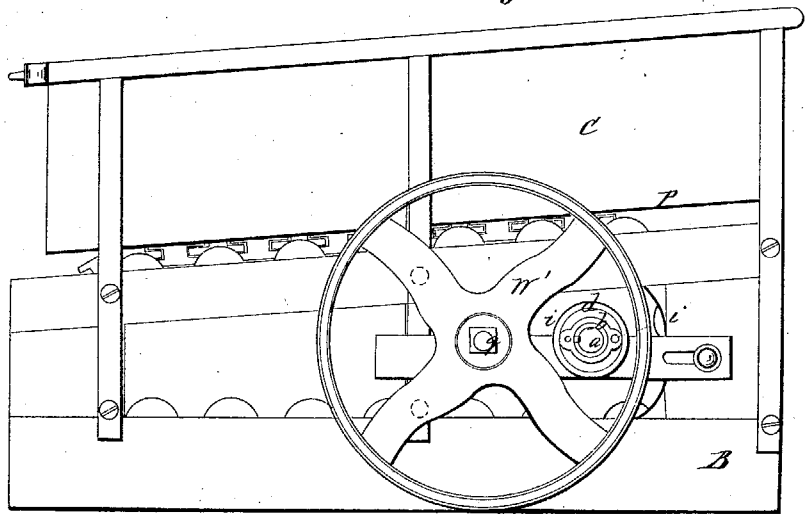

Figure 1 is a side elevation showing gearing. Fig. 2 is a side elevation showing band-wheel. Fig. 3 is an elevation of head of machine.

Similar letters of reference in the several figures denote the same parts of the machine.

The object of my invention is the construction of endless-chain horse-powers in which motion is communicated to the belt-pulley by what is termed "converge gear," so that they may be converted at will into either right or left hand machines without the introduction of any new parts, either of shafting, belt, or gear-wheels.

The nature of the invention consists in constructing the converge-gear shaft for the reception of its wheel on either end, and giving said shaft such relation to the pulley-shaft that the converge-gear shall engage the pinion of the pulley-shaft, and the opposite projecting end of the gear-shaft lie within the plane of the inner face of the arms or spokes of the overreaching belt-pulley in all positions in which the aforesaid wheel and pulley may be placed, as will be hereinafter set forth.

The general features of the machine on which I have made the improvement forming the subject of this specification being well known to those conversant with mechanism of this character need not be more minutely set forth than is shown in the drawings, my invention being altogether independent of any of the well-known constructions for rotating the gear-shaft from the movement of the platform. These several parts will therefore be simply referred to by letter, and only mentioned in their connection with my invention.

P represents the platform, B the base-sills, and C the sides, of the horse-power. The gear-shaft *a* projects on each side of the machine, as is shown on the left in Fig. 3. On each end of this shaft is a coupling, *b*, by which the shaft is connected with the gear-wheel, the inner face of the junction of the arms *f* of the gear-wheel W having a socket for the reception of this coupling *b*, the shaft *a* passing through the wheel, and the inner face of the wheel resting upon the shoulder *d*, screws *e* passing through the wheel into the opening *i* of the coupling. My improvement is not, however, dependent on this mode of attaching the gear, as other modes may be made use of which will serve the same purpose equally as well. The converge-gear wheel W meshes with the pinion *p* upon shaft *q*, on the other end of which is the belt-wheel W′, fastened by any of the well-known modes. This belt-wheel overreaches the end of shaft *a* opposite to that on which the gear-wheel W is secured, and is so situated with respect to the end of the gear-wheel shaft that the plane of the inner face of the arms or spokes of said belt-wheel passes without said projecting end of gear-shaft. By this construction the removal of the belt and gear-wheels is at once effected, and then, by removing the caps which hold the belt-pulley shaft in position, this shaft is readily reversed, so as to bring the pinion upon the opposite side of the machine. The gear-wheel W is then secured on the opposite end of its shaft *a*, and, owing to the relative positions of the several parts of the two shafts, the converge gear at once engages the pinion. The belt-pulley W′ is then secured upon its shaft, and, owing to its relation to the projecting ends of shaft *a*, its inner face passes clear of said shaft in the overreaching of the pulley. These adjustments being completed, the machine is ready for operation.

The simplicity of this mode of converting a horse-power at will into either a right or left hand machine is of great importance to all employing such machines.

What I claim, and desire to secure by Letters Patent, is—

Constructing the horse-power so that the converge gear may be shifted to and secured upon either end of the main shaft, so that by reversing the pulley and pinion, with their shaft, and placing the converge gear upon the proper end of the main shaft, the machine may be converted from a right to a left hand one, or vice versa, without removing the main shaft.

In testimony whereof I have hereunto signed my name before two witnesses.

PHILIP H. KELLS.

Witnesses:
GEO. PATTEN,
JOHN S. HOLLINGSHEAD.